May 9, 1944.   W. ERNST ET AL   2,348,197
BRIQUETTING PRESS MOLDING PROCESS
Filed Sept. 16, 1940   6 Sheets-Sheet 1
FIG. 1
FIG. 2
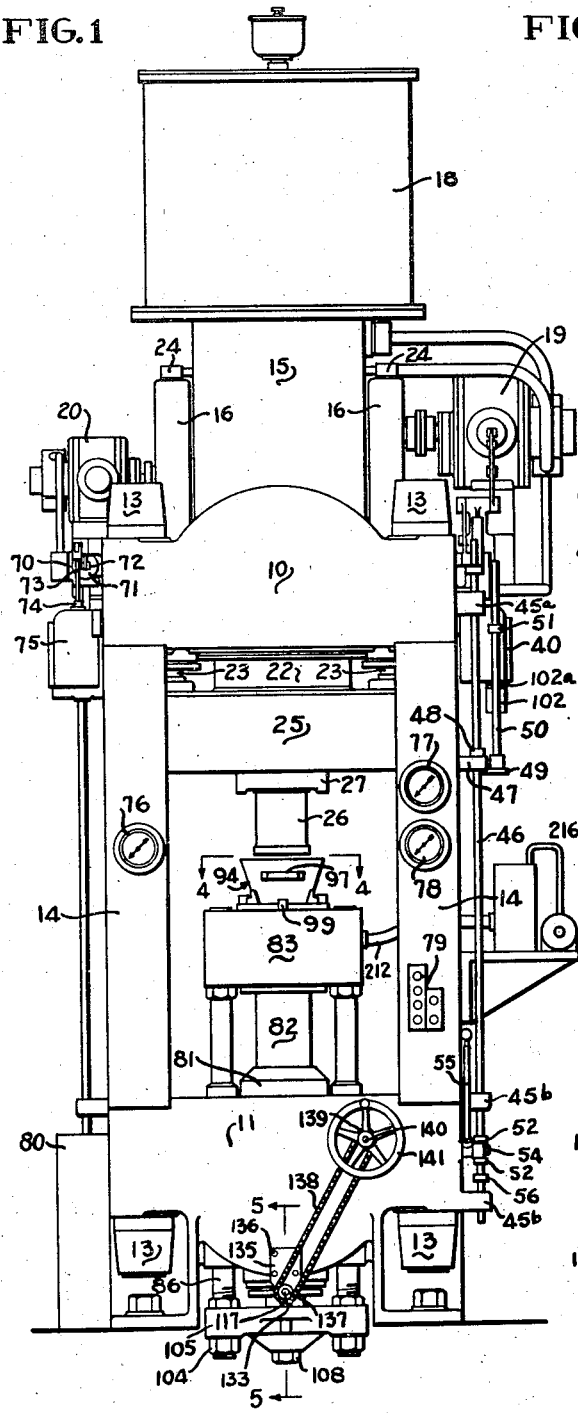
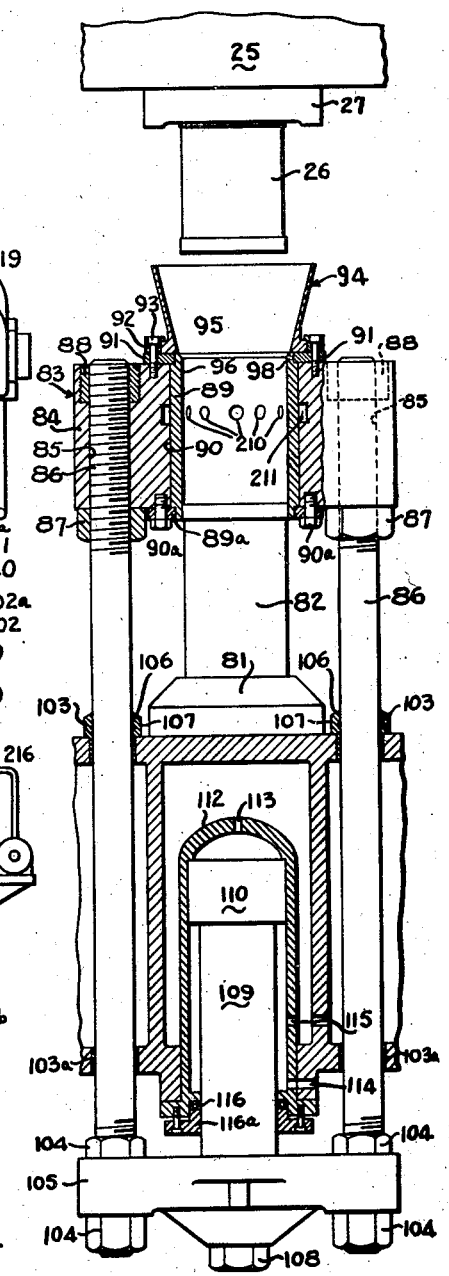
INVENTORS
WALTER ERNST
LESLIE S. HUBBERT
BY
ATTORNEYS

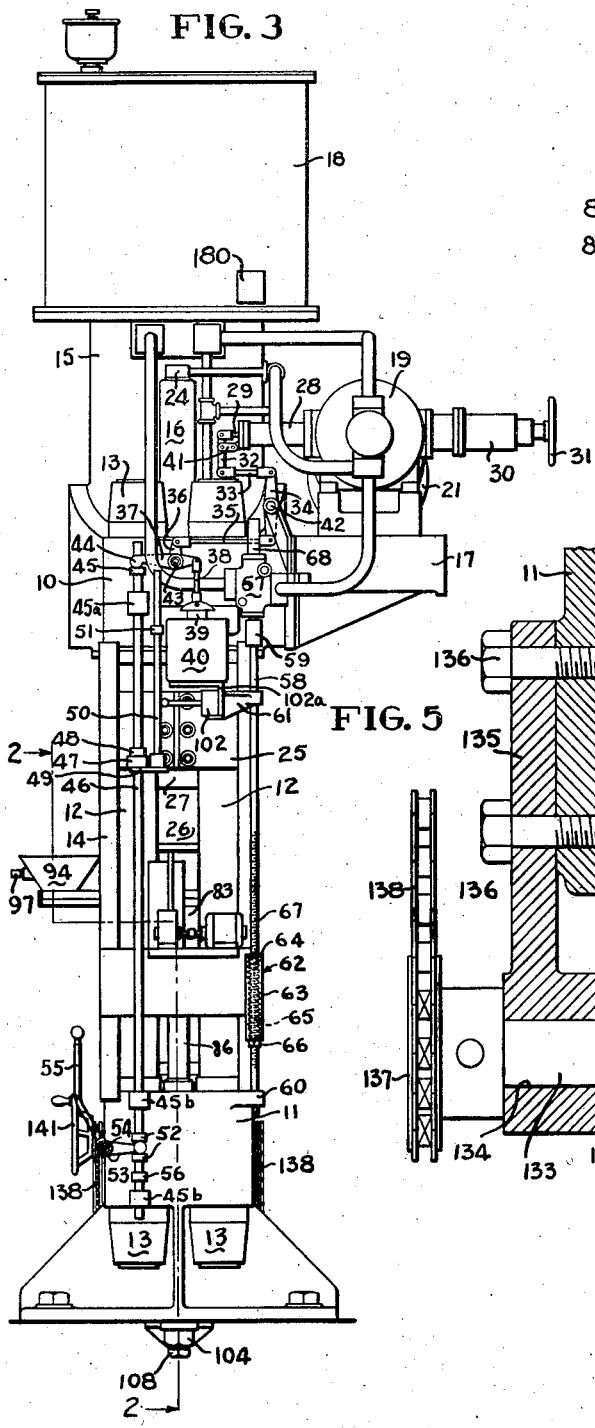
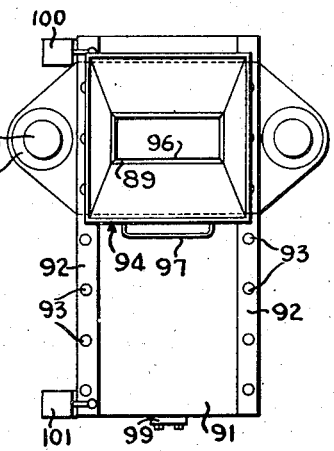
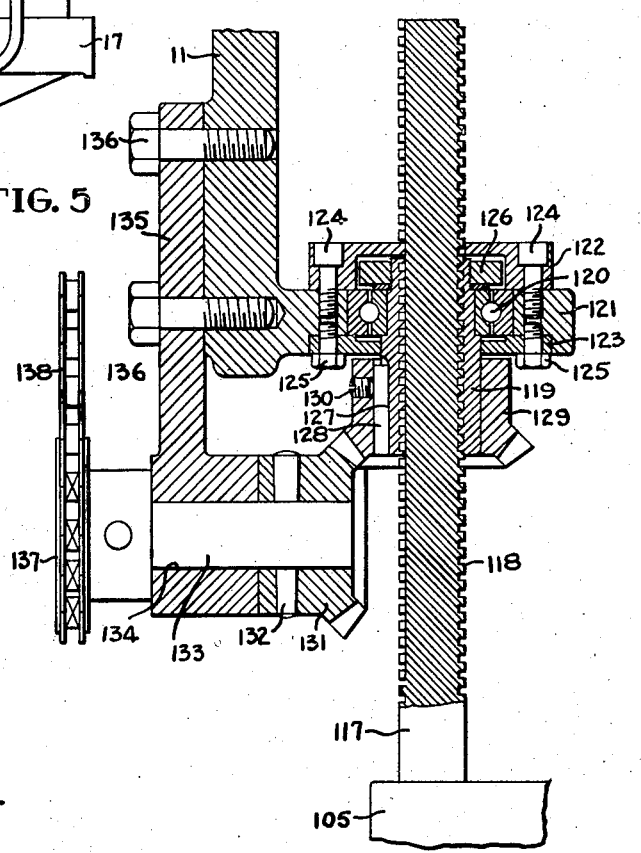

May 9, 1944.   W. ERNST ET AL   2,348,197
BRIQUETTING PRESS MOLDING PROCESS
Filed Sept. 16, 1940   6 Sheets-Sheet 3

INVENTORS
WALTER ERNST
LESLIE S. HUBBERT
BY Toulmin & Toulmin
ATTORNEYS

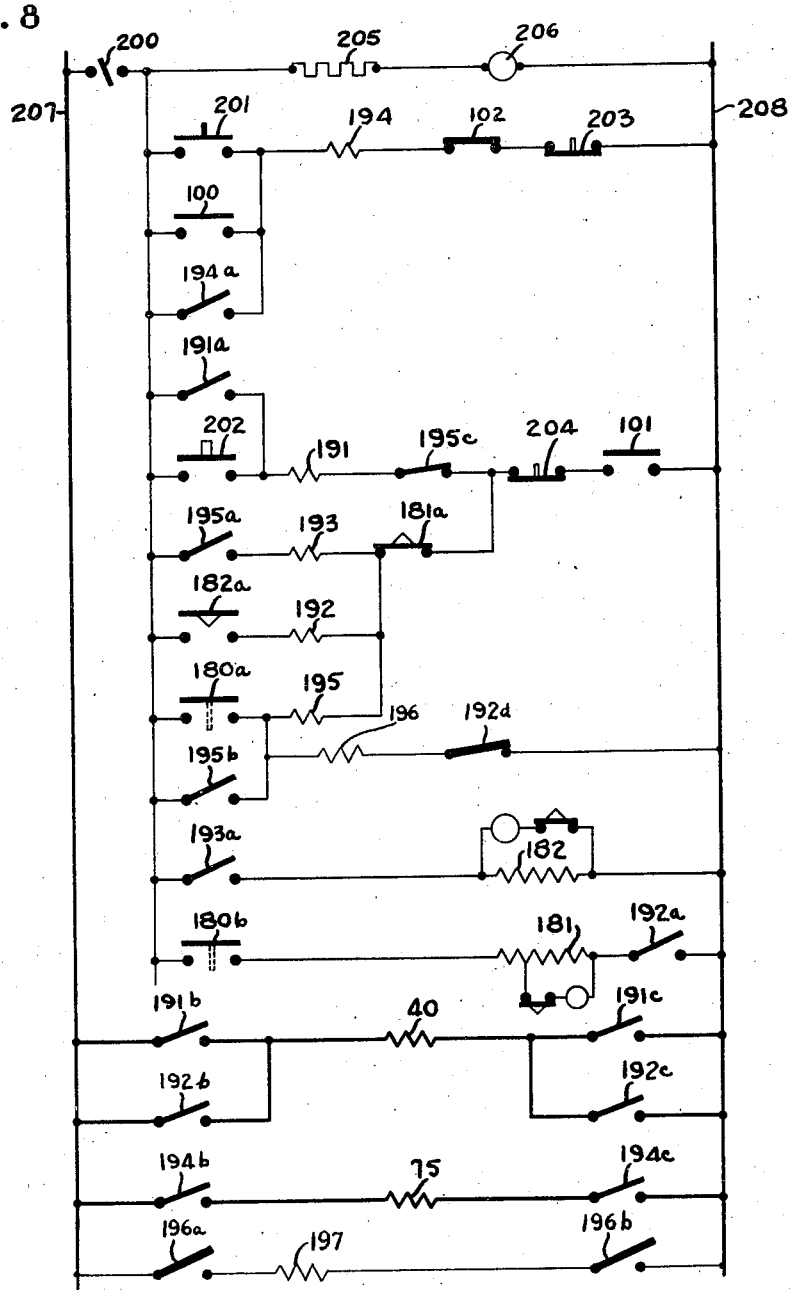

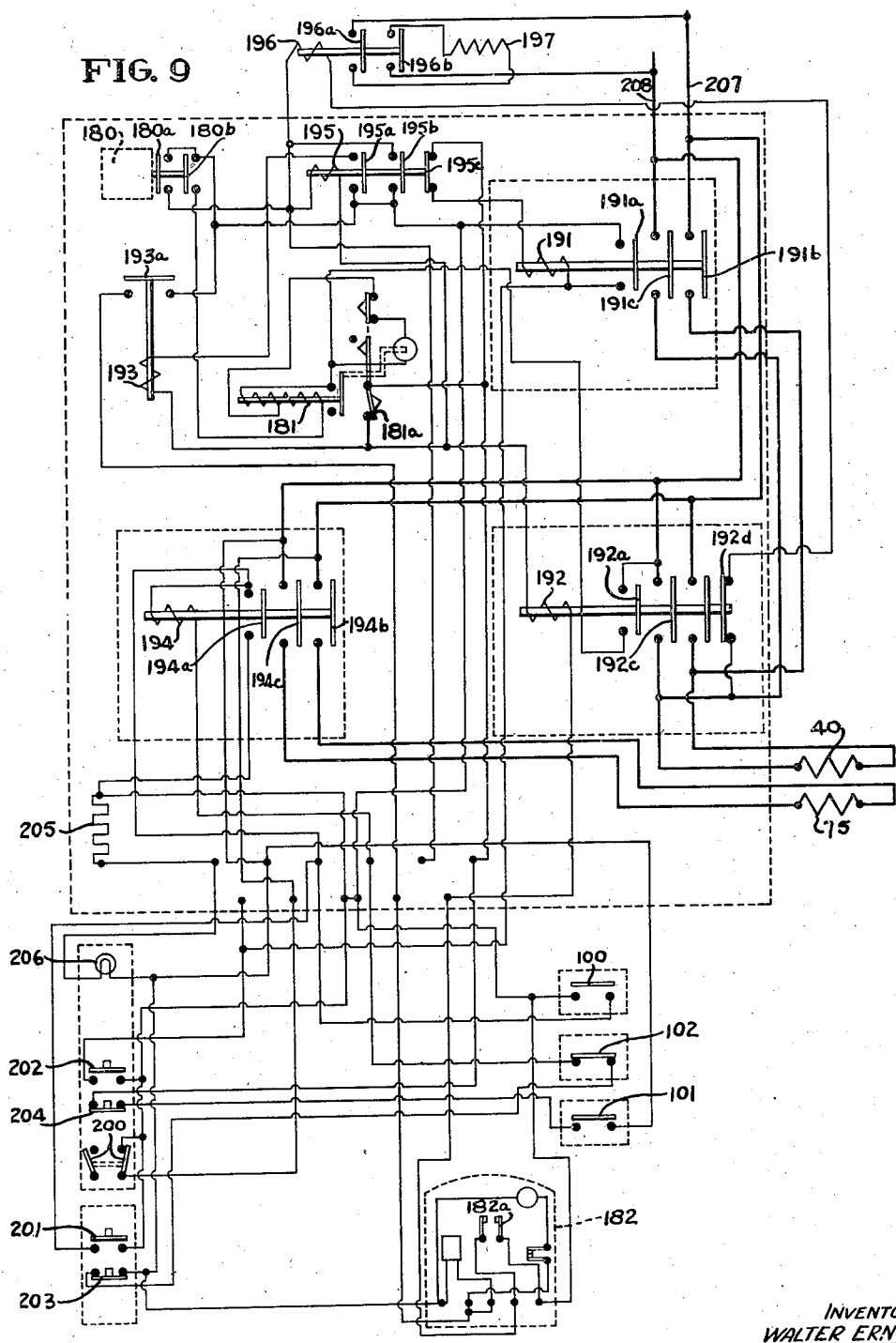

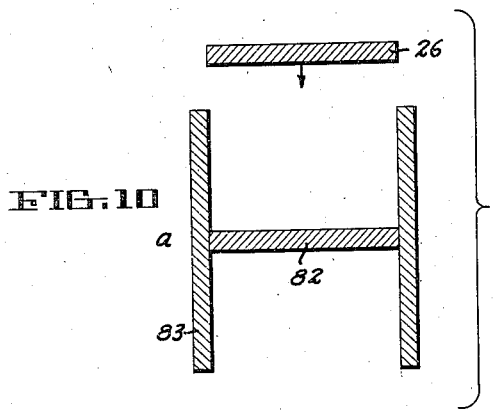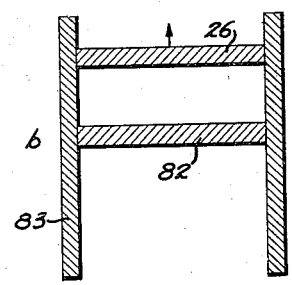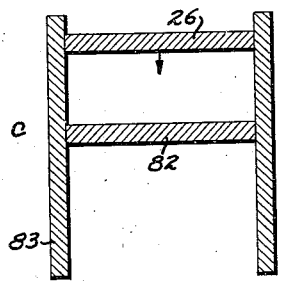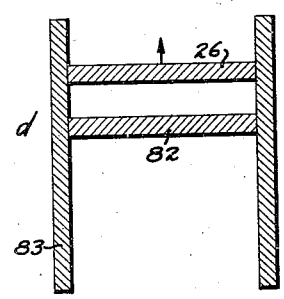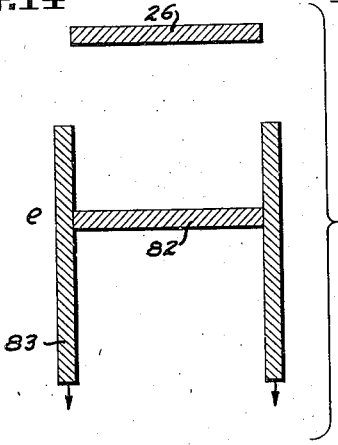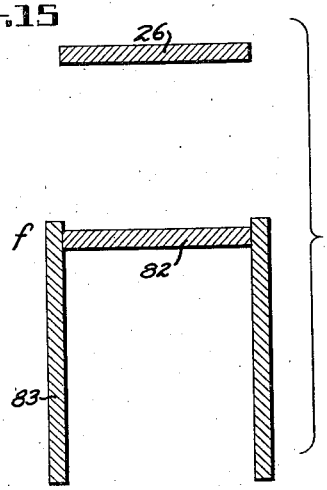

Patented May 9, 1944

2,348,197

UNITED STATES PATENT OFFICE 2,348,197

BRIQUETTING PRESS MOLDING PROCESS

Walter Ernst, Mount Gilead, Ohio, and Leslie S. Hubbert, Cranford, N. J., assignors to The Hydraulic Development Corporation, Inc., Wilmington, Del., a corporation of Delaware Application September 16, 1940, Serial No. 357,016

3 Claims. (Cl. 18—55)

This invention relates to pressing machinery, and in particular to a new method of molding granular material.

One object of this invention is to provide a new method of molding granular material according to which the molding plunger is temporarily and automatically retracted from the workpiece during the working stroke, while air entrapped in the partially compressed workpiece is positively withdrawn therefrom.

Another object of this invention is to provide a method of molding granular material in a mold with a top and bottom member movable relative to the mold according to which the bottom member of the mold and the side wall of the mold are moved relatively to each other so as to provide a suction effect for enhancing filling of the mold during motion in one direction, and preferably to provide an ejection of the workpiece or a placing of the workpiece in position for ejection during motion in the opposite direction.

It is another object of the invention to provide a method of molding granular material in a mold with top and bottom member movable relative to the mold, according to which a more even pressure is exerted upon the material to be molded by effecting a relative movement between the bottom member and side wall portion of the mold while moving the side wall portion of the mold by frictional engagement thereof with the partially compressed material in the mold.

Another object is to provide a molding method as set forth above, according to which the top and bottom member of the mold are moved hydraulically independent of each other.

Another object is to provide a method of molding granular material in a mold with relatively movable sides, top and bottom members, according to which this relative motion is hydraulically effected so as to effect relative motion between the bottom member and the sides during the working stroke by reason of the frictional engagement of the molding material with the walls of the mold, but to permit the mold walls to yield and move only when a predetermined pressure has been reached.

Another object is to provide a molding method, as set forth in the preceding paragraph, according to which the bottom member of the mold is retracted temporarily for a predetermined period of time in response to a predetermined pressure exerted on the molding material, and thereafter caused to resume its pressing stroke.

These and other objects and advantages of the invention will appear more clearly from the following specifications in connection with the press illustrated by way of example in the accompanying drawings, in which:

Figure 1 is a front elevation of a molding press according to one embodiment of the invention.

Figure 2 is a vertical section through the molding press of Figure 1, taken along the line 2—2 in Figure 3, and showing the mold-shifting mechanism.

Figure 3 is a right-hand side elevation of the molding press shown in Figure 1.

Figure 4 is a top plan view of the mold charger looking in approximately the direction of the arrows 4—4 in Figure 1, but with the mold charger in its inner position over the mold for charging the mold with molding material.

Figure 5 is a vertical section taken approximately along the line 5—5 in Figure 1, and showing mechanism for moving the adjustable stops for determining the desired depth of the mold.

Figure 8 is an elementary wiring diagram of the electrical control circuit associated with the hydraulic circuits of Figures 6 and 7.

Figure 9 is a wiring diagram of the same circuit as Figure 8, but with the various portions of each electrical unit arranged in their proper relative positions.

Figures 10 to 15 illustrate diagrammatically various stages of the molding method according to the invention.

General arrangement

Figures 6, 7:
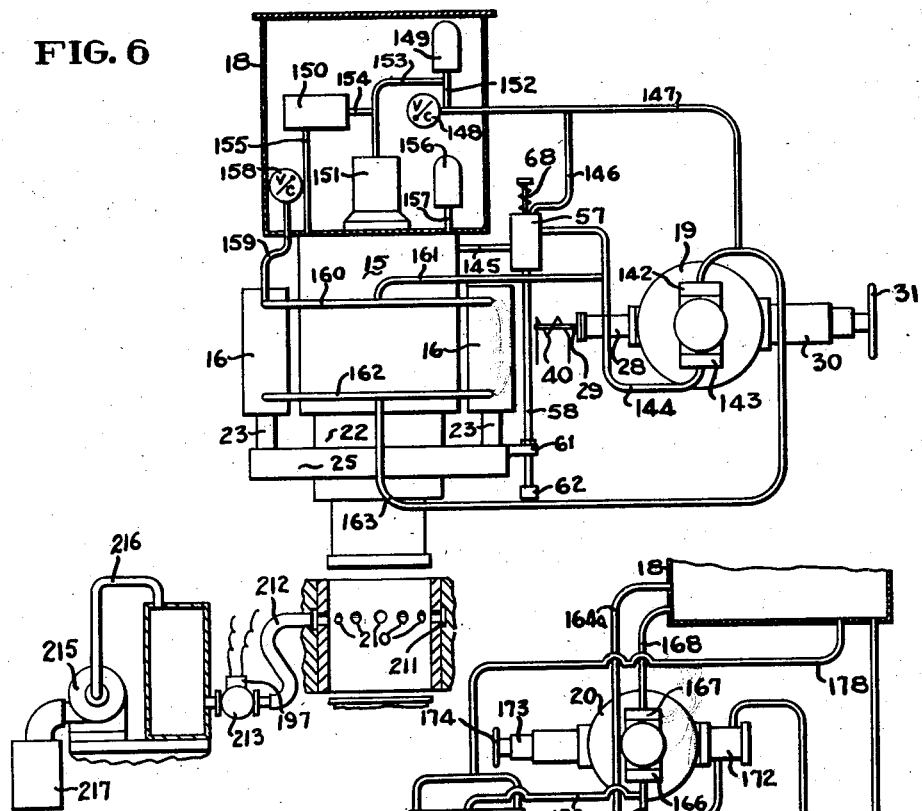
Figure 6 is a diagrammatic view of the main hydraulic circuit for the press of Figure 1 for actuating the main or molding plunger.
Figure 7 is a diagrammatic view of the auxiliary hydraulic circuit for the press of Figure 1 for operating the mold-shifting plunger.

In general, the hydraulic press circuit of this invention consists of a molding press having a main molding plunger adapted to enter a mold which has relatively movable walls, such as relatively movable sides and bottom. Cooperating with the mold is a mold charger which is movable into and out of registration with the mold opening, so as to permit the mold to be charged with molding material. The press is particularly well adapted to be employed for the molding of articles formed from granular molding material.

The mold sides are connected to an auxiliary hydraulic plunger which moves them relatively to the bottom thereof, so that the depth of the mold may be gradually and progressively increased as the charging takes place, thereby facilitating the filling of the mold and reducing the tendency of certain granular materials to arch over the mold cavity and entrap large quantities of air. The distance to which the sides of the mold may move relatively to the bottom is governed by an adjustable stop mechanism, by the action of which the effective depth of the mold cavity may be varied as desired. Thus, the same mold assembly may be employed for the production of different thicknesses of workpieces, hence, the press is particularly well adapted for the production of briquettes of various sizes.

The relative motion between the sides and bottom of the mold also provides for the expulsion of the workpiece from the mold, so that it is in position for ejection when the mold charger moves across the path of the main plunger on the next charging stroke. The sides of the mold are also permitted to yield and move downwardly during the pressing or molding stroke after a predetermined pressure is reached, this motion being caused by the frictional engagement of the molding materials with the side walls of the mold, thus producing the effect of simultaneous pressing upon the top and bottom of the molded article.

An electrical control circuit and two hydraulic circuits are provided for correlating the motions of the mold with the main plunger. These circuits are so arranged that when the mold charger is moved into position over the mold opening, a circuit is closed, which causes the sides of the mold to rise relatively to the bottom, thereby causing the mold cavity to increase in depth from zero to its maximum depth while the molding materials are falling into the mold cavity. This enhances filling of the mold and assists in preventing the arching over of the molding materials during the filling operation, as well as reducing the amount of air entrapped between the particles of the material.

When the mold charger is moved out from registration with the mold cavity and reaches its outer position, a circuit is closed which causes the main plunger to advance into the mold, pressing the particles of molding material together. When the pressing pressure reaches a predetermined amount a pressure-responsive device, such as a pressure switch, alters the condition of the circuit in such a manner as to cause the pressing plunger to retract or back off temporarily, while a suction device is actuated to withdraw air which has been forced out from between the particles of the material into the mold, and which would otherwise reduce the strength of the molded article and place the latter under an internal strain with the result that eventually fracture will be caused if not very carefully handled or during storage. A timing device controls the length of the period of backing-off of the main plunger.

At the expiration of this period the main plunger or molding plunger reenters the mold and proceeds upon its finishing stroke. During this pressing or molding stroke the sides of the mold are strongly and frictionally engaged by the partially formed workpiece. The side walls of the mold are permitted to yield downwardly by reason of this frictional engagement, the pressure at which yielding takes place being controlled by a pressure-releasing device such as a safety valve. This action gives the effect of plungers simultaneously moving in opposite directions at the top and bottom of the mold.

When the pressure again reaches a predetermined amount, the condition of the circuit is so changed that the main plunger is caused to exert a pressure dwell for a predetermined time period, as controlled by a second timing device. When the operating period of this second timing device has expired, the condition of the circuit is again changed in such a manner that the motion of the main plunger is reversed so that it executes a retraction stroke. On its way back to its retracted position the main plunger actuates devices which operate the circuit in such a manner as to cause the sides of the mold to move relatively to the bottom, and to eliminate the cavity in the mold by bringing the bottom and top edges of the mold opening on the same level, thereby expelling the block or other molded workpiece. The operator having previously refilled the mold charger, again moves it into the mold-charging position, whereupon this motion also ejects the workpiece from the press. The operator then withdraws the mold charger to its outer position, thereby conditioning the circuit for the repetition of a molding cycle. Meanwhile, the main plunger has reached the top of its retraction stroke and has actuated devices which cause it to come to a halt.

Hitherto, the molding of articles, particularly briquettes, has been unsatisfactory due to the fact that certain kinds of materials, when molded into briquettes, gave mediocre results as regards the strength of the briquette. Such briquettes when roughly handled or even during storage, would frequently develop cleavage cracks or actual fractures. This has been particularly true in the case of the molding of briquettes of such granular material as carbon. Extensive study of this problem has led investigators to believe that the fragility of such blocks has been due to the entrapment of air within the block or briquette, with the result that this entrapped air places the block under a strain tending to produce deformation when the block is expelled from the press. The molding press and circuit of the present invention substantially eliminates this defect by causing the molding plunger to partially execute a molding stroke, and then to back off so as to release the pressure and enable the entrapped air to escape. The molding plunger then proceeds upon the balance of its molding stroke and finishes the molding operation.

It has been found that molded blocks or briquettes produced by the press and circuit of the present invention are of such greater strength than those hitherto produced in that the development of the cracks or cleavage planes, previously mentioned, does not occur, and also that the finished blocks or briquettes will stand much rougher handling either in shipment or in use than those hitherto produced. At the same time, the press and circuit of the present invention enable the production of these blocks to be carried out rapidly and economically with an automatic cycle of operation requiring no attention upon the part of the operator other than the charging of the mold and the closing of the starting switches. While the circuit may be arranged for full automatic operation so as to repeat a number of molding strokes, it has been found that the presence of the operator is desirable in the event that the charging of the mold may tend to take place incompletely or in a faulty manner, due to variations in the molding material or to atmospheric conditions. The present press and circuit are, therefore, shown as embodying semi-automatic operation according to which the press executes a full working cycle automatically, and then comes to a halt. The operator then restarts the press to bring about the next working cycle.

Main press construction

The molding press according to the preferred embodiment shown in Figures 1 to 5, consists of a head 10 and bed 11 interconnected by strain rods 12 (Figure 3), the whole being held in assembly by nuts 13 upon the threaded ends of the strain rods. Vertical cover plates 14 are provided for partially concealing the strain rods, these cover plates 14 extending between the head 10 and bed 11 of the press. The head 10 is provided with a main cylinder 15 and double-acting booster and pull-back cylinders 16, extending upwardly from the head 10. A shelf 17, in the form of a bracket, is also secured to the rearward side of the head 10 (Figure 3) for the support of certain of the parts of the circuit. Superimposed upon the main cylinder 15 is a surge tank 18 for containing the oil or other working liquid used in the hydraulic circuit.

Mounted upon the shelf 17 is a reversible variable delivery main pump 19 and a variable delivery auxiliary pump 20, both being driven by a motor 21 (Figure 3). The main pump 19 supplies pressure fluid for actuating the main circuit so as to advance and retract the main plunger 22 reciprocable in the main cylinder 15, as well as the booster and pull-back plungers 23 reciprocable in the booster and pull-back cylinders 16. The booster and pull-back plungers 23 are double-acting, pressure fluid being applicable to the upper ends through the connections 24 for rapidly advancing the main platen 25 to the work, and with it the molding plunger 26 upon the molding plunger support 27 secured to the platen 25.

The reversible variable delivery main pump 19 is of a type well known to those skilled in the art and requires no special discussion. Any suitable pump may be employed, the pump shown being of the radial piston type having the volume and direction of delivery of pressure fluid controlled by a shift ring (not shown) under the action of a servomotor 28, controlled by a servomotor control valve member 29 (Figure 3). The variable delivery pump 19 is also provided with a pressure control unit 30, within which is mounted spring mechanism the force of which is adjustably controlled by the hand wheel 31. This pressure control unit 30 enables the shifting or flow-control member of the pump to be moved automatically to its zero delivery or neutral position upon the attainment of a predetermined pressure in the circuit.

The servomotor control valve member 29 is pivotally connected to a rocking lever 32 pivotally connected through a connecting rod 33 to a rocking lever 34. The rocking lever 34 is connected by a connecting rod 35 to an arm 36, connected to the working lever 37, the latter being connected at one end by the connecting rod 38 to the armature 39 of a solenoid 40, mounted upon the press head 10. The rocking levers 32, 34 and 37 are pivotally supported upon fulcrum members 41, 42 and 43, respectively, (Figure 3). The other end of the rocking lever 37 is provided with a rounded yoke portion 44, engaged by a collar 45 upon the main press control rod 47, which is reciprocable vertically in bosses 45ª and 45ᵇ upon the head 10 and bed 11, respectively. The platen 25 is provided with a platen arm 47 engageable with an adjustable collar 48 upon the main press control rod 46, whereby the latter will be lifted when the platen 25 rises to a predetermined point, thereby shifting the servomotor control valve member 29 through the previously mentioned connecting rods and levers, into a position where the servomotor 28 will place the shiftring or flow-control member of the pump 19 in its neutral position, halting the upward travel of the main platen 25. Secured to the platen arm 47 and movable therewith is a bracket 49 (Figure 3), upon which is mounted an upwardly extending switch-actuating rod 50 carrying an adjustable switch-actuating collar 51. The collar 51 is adapted to operate a limit switch, subsequently to be described, on the upward stroke only of the platen 25.

The main control rod 46 is provided with a pair of spaced collars 52, engaging the yoked end of an arm 53 pivotally mounted upon a stud 54 and connected to a hand lever 55. By manipulating the hand lever 55 the main press control rod 46 may be thus moved up or down for manual control of the servomotor control valve member 29. An additional collar 56 is mounted near the lower end of the main press control rod 46 for limiting the descent thereof.

Also mounted upon the press head 10 is a two-way valve 57, having a valve rod 58 reciprocable in bosses 59 and 60 upon the head 10 and bed 11 of the press. The platen 25 is provided with an auxiliary platen arm 61, which is adapted to move downwardly with the platen 25 into engagement with a yielding adjustable collar 62 slidably mounted upon the valve rod 58. The adjustable collar 62 is in the form of a deep inverted cup 63, with the closed end 64 bored for the passage of the valve rod 58 so as to be slidable relatively to the latter. The cup-shaped member 63 contains a coil spring 65 which seats at one end against the closed end 64, and at its other end against a nut 66 threaded upon the threaded portion 67 of the valve rod 58. The two-way valve 57 is maintained in a normally closed position by a spring unit 68, at the top thereof, tending to urge the valve rod 58 upwardly. The two-way valve 57 is of a conventional type and its details form no part of the present invention. The valve shown is of the piston type, having spaced heads (not shown) mounted upon the valve rod 58 and cooperating with suitable ports to open or close communication therebetween in a manner well known to those skilled in the art.

When the platen 25 and platen arm 61 move downwardly into engagement with the yielding collar 62, force is transmitted from the platen arm 61 to the valve rod 58 through the coil spring 65, urging the valve rod 58 downwardly until the normally closed two-way valve 57 is opened, whereupon the platen 25 and platen arm 61 continue to move without further moving the valve rod 58 merely by compressing the spring 65. The hydraulic connections of the two-way valve 57 are described below under the heading "Main hydraulic circuit."

Mounted on the opposite side of the press head 10, in addition to the auxiliary pump 20, is a four-way valve 70 of a conventional type, preferably of a balanced piston type, having spaced heads (not shown) shifted relatively to ports in the casing 71 thereof by means of a valve rod 72 (Figures 1 and 7). The valve rod 72 is connected by a linkage 73 to the armature 74 of a solenoid 75, likewise mounted upon the head 10 of the press. Mounted upon the cover plates 14 are pressure gauges 76, 77 and 78 for indicating the pressure conditions existing in various parts of the circuit. Also mounted upon the right-hand side plate 14 is a control switch panel 79. Mounted adjacent the bed 11 on the left-hand side of the press is a cabinet 80 for receiving the various electrical elements, such as contactors, time relays, etc., described under the heading "Electrical circuit."

*Construction of mold and mold-actuating means*

Mounted on a support 81 on the press bed 11 is an anvil or mold bottom 82, which forms a closure for a slidable mold 83. The slidable mold 83 consists of a block 84 having bores 85 for receiving connecting rods 86 having retaining nuts 87 and 88, threaded thereon. The block 84 is provided with a sleeve or mold lining 89 mounted in the bore 90, and having a cross-section corresponding to the cross-section of the workpiece to be molded, for example, a rectangular cross-section for molding rectangular blocks. The mold sleeve or lining 89 is provided with one or more bores 210 adapted to effect communication between the interior of the sleeve 89 and an annular recess 211 in the block 84. The bores 210 and the recess 211 are arranged intermediate the upper and lower end of the sleeve 89 so that at the end of the first compressing step, i. e. when the plunger 26 is temporarily withdrawn, to allow escape of the compressed air, the upper surface of the compressed molding material is below said bores 210.

The annular recess 211 communicates with a conduit 212 leading to a control valve 213 which is normally closed but is adapted to be opened by energization of solenoid 197 associated therewith, so as to effect communication between the conduit 212 and a vacuum prevailing in the container 204 and maintained therein by the pump 215 communicating with container 204 through conduit 216. The pump 215 has its exhaust connected with a collector 217 for collecting the powdered molding material withdrawn through the bores 210.

The lining 89 is retained in position within the bore 90 by a retaining member 89ᵃ surrounding the lower rim of the mold lining 89 and held in position by the bolts 90ᵃ.

Mounted upon the upper side of the block 84, on opposite sides of the sleeve 89, is a plate 91 with parallel guides 92, bolted to the mold by the bolts 93. Slidably mounted in the parallel guides 92 is a mold charger 94 (Figures 2 and 4), in the form of a hopper and having an open bottom 95 adapted in one position to register with the mold cavity 96, which may move up and down relatively to the mold bottom 82. The mold charger 94 is provided with a handle 97 for moving it into and out of registry with the mold cavity 96. The plate 91 is provided with an opening 98 fitting around the upper rim of the mold sleeve 89. The plate 91 forms a bottom for the mold charger 94 when the latter is retracted from its charging position over the mold cavity 96, this retraction being accomplished by means of the handle 97. Stop means 99, secured to the plate 91, prevent the mold charger 94 from being drawn too far out of its guides 92. Mounted to be engaged and shifted by the mold charger 94, at the opposite limits of its travel, is a pair of limit switches 100 and 101. These limit switches are described in more detail below. An additional limit switch 102 (Figure 3) is mounted upon a bracket 102ᵃ bolted to the bottom of the solenoid 40 for actuation by the adjustable collar 51 on the upward stroke of the platen arm 47 and switch-actuating rod 50 connected thereto.

The connecting rods 86 pass through bushings 103 and 103ᵃ mounted in the press bed 11, and are threaded at their lower ends to receive nuts 104, securing them to a crosshead 105. The upper surface 106 of each bushing 103 is tapered so that any particles of material which may fall upon it will slide down it and fall upon the press bed 11. Each bushing 103 also has a cylindrical side wall 107, which is of sufficient height that a pile of material particles can accumulate before there is any danger of these particles working their way into the bearing formed between the connecting rods 86 and the bushings 103. The upper surfaces 106, for convenience, may be of conical form and thus prevent the accumulation of material or dirt particles occurring in bushings having the ordinary flat upper surfaces. Such bushings with flat upper surfaces accumulate particles of material or dirt which work their way down into the bushing and cause wear and scoring of the bushing or its connecting rod.

Secured to the crosshead 105, as by the bolt 108, is a plunger 109 with a piston head 110 reciprocable within the bore 111 of a cylinder 112. The cylinder 112 is provided with ports 113 and 114 near its opposite ends, and an intermediate port 115 spaced apart from the port 114 by approximately the thickness of the piston head 110 (Figures 2 and 7). A packing 116 and a gland 116ᵃ, bolted to the cylinder 112, serve to prevent leakage around the plunger 109.

Adjustable stops 117 (Figures 1 and 5) are provided for engagement by the crosshead 105 so as to limit the distance through which the mold 83 and mold lining 89 will move upward relatively to the mold bottom 82. By adjusting these stops 117 the depth of the mold cavity 96 from its upper rim to the upper surface of the mold bottom 82 can be varied so as to vary the sizes of the workpieces or blocks molded by the apparatus. In order to provide for such adjustment, the adjustable stops 117 are threaded, as at 118 (Figure 5), to receive a threaded sleeve-like nut 119 rotatably mounted in the anti-friction bearings 120, which in turn, are supported in the press bed portions 121 by the retaining rings 122 and 123, bolted thereto as at 124 and 125, respectively. Threaded upon the upper end of the sleeve-like nut 119 is a retaining collar 126. The sleeve-like nut 119 is provided with a longitudinal keyway 127 for receiving a key 128, by which a bevel gear 129 is drivingly mounted upon the nut 119 and held in place by the set screw 130.

Meshing with the bevel gear 129 is a corresponding bevel gear 131, secured by the taper pin 132 to the shaft 133. The latter is rotatably mounted in a bore 134 in the lower end of a bracket 135, secured by the bolts 136 to the press bed 11. Secured to the outer end of the shaft 133 is a sprocket 137 meshing with a sprocket chain 138, which passes around a similar sprocket 139 mounted upon a shaft 140 passing through and journalled in the press bed 11. There are two of the threaded stop rods 118, and the mechanism assembly shown in Figure 5 is thus duplicated on opposite sides of the press (Figure 3). Mounted on the front end of the shaft 140 is a hand-wheel 141, by which the shafts 140 and 133 may be rotated so as to rotate the nuts 119 and adjustably move the stop rods 117 upward or downward. When the stop rods 117 are moved upward the maximum depth of the mold cavity 96 is increased, but when they are moved in the opposite direction this depth is decreased.

Main hydraulic circuit

The main hydraulic circuit (Figure 6) for actuating the main plunger 22 and combination pull-back and booster plungers 23 is a closed circuit, and includes the reversible variable delivery pump 19, the surge tank 18, the main cylinder 15 and the combination booster and pull-back cylinders 16 and the two-way valve 57 already described. The variable delivery pump 19 is provided with fluid connections 142 and 143, which have opposite characteristics. The fluid connection 142 is a suction connection during the forward stroke of the main plunger 22, whereas the connection 143 is a pressure connection at that time. On the retraction stroke of the main plunger 23, however, the connection 142 is a pressure connection and 143 is a suction connection.

Running from the connection 143 to the two-way valve 57 is a conduit 144, and from the two-way valve 57 a conduit 145 runs to the upper end of the main cylinder 15. A third conduit 146 runs from the upper end of the two-way valve 57 to a junction with a conduit 147 running from the connection 142 to other devices within the surge tank 18. These devices consist of a check valve 148, a safety valve 149, a main cylinder relief and pump by-pass valve 150 and a surge valve 151. The conduit 152 runs from the conduit 147 to the safety valve 149, whence the conduit 153 runs to the operating chamber of the surge valve 151. An additional conduit 154 runs from the conduit 153 to the valve 150, and a conduit 155 runs from the latter to the main cylinder 15. A safety valve 156 is also mounted within the surge tank 18 and connected by the conduit 157 to the main cylinder 15.

A check valve 158 within the surge tank 18 is connected by the conduit 159 to the conduit 160 interconnecting the upper ends of the cylinder 16, from which the conduit 161 runs to a junction with the conduit 144. The check valves 148 and 158 open in a direction toward the conduits 147 and 159, to which they are connected so as to admit fluid from the surge tank 18 to these conduits and to prevent passage of fluid in the opposite direction. The main cylinder relief and pump by-pass valve is disclosed and claimed in the patent to Ernst No. 1,956,758, dated May 1, 1934, whereas the surge valve 151 is similarly disclosed and claimed in the patent to Ernst No. 1,892,568, dated December 27, 1932. The lower ends of the cylinders 16 are interconnected by a conduit 162, from which the conduit 163 runs to a junction with the conduit 147. The operation of the main hydraulic circuit of Figure 6 is subsequently described under the heading "Operation." Thus, the circuit of Figure 6 is a closed circuit, wherein the direction of flow of the pressure fluid to the main cylinder 15 and the combination booster and pull-back cylinders 16 is effected by reversing the reversible delivery pump 19.

Mold-actuating hydraulic circuit

The auxiliary hydraulic circuit for moving the mold 83 upward or downward is an open circuit, and includes the surge tank 18, the variable delivery auxiliary pump 20, the four-way valve 70, the safety valve 164, the relief valve 165 and the cylinder 112. Thus, the direction of flow of the pressure fluid in the open circuit of Figure 7 is controlled by the shifting of the four-way valve 70. The variable delivery pump 20 is not reversed during the operation of the press, but has a constant pressure connection 166 and suction connection 167. The suction connection 167 is connected by the exhaust conduit 168 to the surge tank 18, whereas the pressure connection 166 is connected by the pressure conduit 169 to the safety valve 164.

Running from the pressure conduit 169 to the four-way valve 70 is a pressure conduit 170. A branch pressure line 171 runs from the pressure conduit 169 to the pump control cylinder 172, the latter being mounted upon the opposite side of the pump 20 from the pressure regulating mechanism 173, controlled by the hand-wheel 174. The pressure regulating mechanism 173 consists of a spring assembly, the force of which is regulated by the hand-wheel 174. This spring assembly urges the shiftring or flow-control member of the pump 20 in a direction tending to place the pump upon stroke, whereas a piston within the pump control cylinder 172, connected to the pump shiftring, urges the latter in the opposite direction toward its neutral or no delivery position. This mechanism is conventional and well known to those skilled in the hydraulic pump art, and its details form no part of the present invention. When the pressure in the pressure conduits 169 and 170 reaches a predetermined maximum, the piston within the pump control cylinder 172 will move the pump flow-control member or shiftring to its neutral position, overcoming the thrust of the spring assembly within the pressure regulating mechanism 173. The safety valve 164 is provided as an additional precaution against failure of the other mechanism to operate. Running from the opposite end of the pump control cylinder 172 to the port 115 of the cylinder 112 is a conduit 175.

The four-way valve 70 is of a conventional type well known to those skilled in the art, and any suitable type may be used. In a convenient type of four-way valve, spaced piston heads are mounted upon the valve rod 72 and cooperate with ports in which the conduits 170, 176, 177 and 178 terminate. The conduits 176 and 177 run to the ports 113 and 114 at the opposite ends of the cylinder 112, whereas the conduit 178 runs from ports at the opposite ends of the four-way valve 70 to the surge tank 18. Additional exhaust conduits 164ª and 179 run, respectively, from the safety valve 64 to the relief valve 165. The relief valve 165 is likewise of a conventional type and is described and claimed in the patent to Ernst No. 2,089,295, dated July 6, 1937.

Electrical circuit

The electrical circuit, which controls the hydraulic circuits described above, is shown in the elementary circuit of Figure 8 and in the electrical unit circuit of Figure 9. The elementary circuit of Figure 8 shows the relative connections of the various switches operated by the different contractors or control relays. The more elaborate circuit of Figure 9 shows the switches of each contactor arranged adjacent the operating coil thereof so that the various electrical units and their switches are collected. For tracing the circuits, therefore, it is convenient to utilize Figure 8, whereas for locating the different interlocks or switch blades operated by the different contactors or control relays, it is advisable to consult Figure 9.

The electrical circuit consists of a plurality of control relays or contactors, limit switches, time relays and manual switches for controlling the energization of the solenoids 40 and 75, described above. The solenoid 40, as previously stated, when energized shifts the servomotor control valve rod 29 to put the main pump 19 upon stroke for delivery of pressure fluid to the conduit 144, whereby the press plungers 22 and 23 are caused to advance. When the solenoid 40 is deenergized, a spring within the servomotor 28 causes the servomotor control valve rod 29 to move in the opposite direction for reversing the delivery of the variable delivery pump 19. The solenoid 75, on the other hand, controls the shifting of the valve rod 72 of the four-way valve 70.

When energized the solenoid 75 shifts the four-way valve 70 to direct pressure fluid from the pressure conduits 169 and 170 to the conduit 176 leading to the port 113 at the top of the mold-shifting cylinder 112, causing the plunger 109 and connecting rods 86 to move the mold 83 downward past the mold bottom 82, so as to eject the workpiece from the mold cavity 96. When the solenoid 75 is deenergized, however, a spring associated with the valve 70 shifts the valve rod 72 in the opposite direction to direct pressure fluid to the conduit 177 leading to the port 114 at the bottom of the mold-shifting cylinder 112. This causes the plunger 109 and connecting rods 86 to move upward past the mold bottom 82 until the crosshead 105 encounters the ends of the stop rods 117 and halts, thereby placing the upper rim of the mold cavity 96 a predetermined distance above the mold bottom 82. When one of the conduits 176 or 177 thus becomes a pressure conduit, the other conduit is automatically connected by the four-way valve 70 to the exhaust conduit 178 leading to the surge tank 18.

The electrical control circuit also contains three limit switches 100, 101 and 102, previously mentioned. The limit switch 100 is a normally open limit switch which is closed when it is engaged by the mold charger 94 at its inner position over the mold cavity 96. This switch, when closed, brings about the energization of the solenoid 75, to shift the four-way valve 70 into a position causing the plunger 109, the connecting rods 86 and mold 83 to move upward relatively to the mold bottom 82. When the mold charger 94 is moved outward the limit switch 100 is automatically opened, but the energization of the solenoid 75 is temporarily maintained through a holding circuit described below.

The limit switch 101 is normally open and is closed by the engagement of the mold charger 94 at the outer position of the latter, this normally open limit switch 101 being in series with the circuit controlling the energization of the solenoid 40, and must be closed by the mold charger 94 in its outer or retracted position before the solenoid 40 can be energized to place the main variable delivery pump 19 upon its forward stroke and cause the main platen 25 to advance. The limit switch 101 is, therefore, a safety switch which insures that the mold charger 94 shall be completely withdrawn from beneath the mold plunger 26 before the latter can advance into the mold cavity 96.

The limit switch 102 is a normally closed track switch, which is opened by the adjustable collar 51 on the rod 50 attached to the platen arm 47 on the return stroke only of the main platen 25. When this normally closed switch is thus opened, it brings about the deenergization of the solenoid 75 so as to permit the spring associated with the four-way valve 70 to shift the latter and cause the mold-shifting plunger 109 to move downward, carrying with it the connecting rods 86, mold 83 and mold lining 89 downward past the mold bottom 82. This action leaves the workpiece or briquette exposed on top of the mold bottom 82, ready to be ejected from the press when the operator next moves the mold charger 94 inward to recharge the mold.

The control circuit also contains a normally open pressure switch 180, which has two normally open switch blades 180ᵃ and 180ᵇ, which close on their contacts upon the attainment of a predetermined pressure in the main cylinder circuit, hence, in response to the attainment of a predetermined pressure upon the workpiece or briquette. The blade 180ᵃ controls the energization of one of the contactor coils, as hereinafter described, whereas the blade 180ᵇ controls the energization of a time relay, also described below.

The control circuit also contains two time relays 181 and 182. The energization of the time relay 181 is under the control of the pressure switch 180, and has a single normally closed blade 181ᵃ. The time relay 181 regulates the length of a pressure dwell at the end of the forward or pressing stroke of the molding plunger 26, and starts running when the normally open pressure switch 180 closes its switch blade 180ᵇ upon its contacts. At the expiration of the time period for which the time relay 181 is set, it opens its normally closed blade 181ᵃ which deenergizes several of the contactors mentioned below, among them a contactor which deenergizes the solenoid 40 which causes the reversal of the main variable delivery pump 19.

The time relay 182 has a single normally open switch blade 182ᵃ, which controls the energization of one of the contactors and is also in itself controlled by another contactor, as explained below. The time relay 182 controls the time period during which the molding plunger 26 backs off and slightly retracts after making a partial molding stroke. This backing-off is for the purpose of permitting entrapped air to escape from the workpiece or briquette. At the expiration of the time period for which the time relay 182 is set, the latter closes its normally open switch blade 182ᵃ and brings about the reenergization of the solenoid 40 and with it the setting of the main pump 19 upon its forward delivery to cause the molding plunger 26 to again advance and finish its working or molding stroke.

The control circuit also contains five contactors or control relays 191 to 195, inclusive. The contactor 191 controls the energization of the main solenoid 40 so as to shift the main pump 19 to it forward delivery position and advance the molding plunger 26. The contactor 191 is provided with three normally open switch blades 191ᵃ, 191ᵇ and 191ᶜ. The switch blade 191ᵃ operates a holding circuit for maintaining the energization of the contactor 191 when it is once energized subject to the control of other contactor switches and limit switches, subsequently to be described. The switch blades 191b and 191c directly control the energization of the solenoid 40 as to both of its leads.

The contactor 192 is directly under the control of the time relay switch 182a and the time relay switch 181a, as well as the limit switch 101, and is provided with three normally open switch blades 192a, 192b and 192c. The switch blade 192a cooperates with the pressure switch blade 180b to control the energization of the time relay 181. The switch blades 192b and 192c directly control the energization of the main solenoid 40 by closing bridging circuits around the normally open switch blades 191b and 191c (Figure 8). The contactor 192 controls the resumed advance of the molding plunger 26 to complete its molding stroke after it has been momentarily halted and backed off by the closing of the pressure switch 180 for the escape of the air bubbles from the workpiece or briquette. The contactor 192 thus reenergizes the main solenoid 40 while the contactor 191 is in a deenergized condition following the backing-off stroke of the molding plunger 26.

The contactor 193 is provided with a single normally open switch blade 193a, which directly controls the energization of the time relay 182 which, in turn, controls the time period during which the molding plunger 26 backs off for the release of air from the workpiece. Its energization is under the control of the time relay 181 and also under the control of one of the switch blades of the contactor 195, as well as the limit switch 101.

The contactor 194 is provided with three normally open switch blades 194a, 194b and 194c. The switch blade 194a controls a holding circuit in the energization of the contactor 194, subject to the control exercised by the limit switch 102. The switch blades 194b and 194c directly control the energization of the auxiliary solenoid 75, and hence, control the shifting of the four-way valve 70 to control the motion of the mold-shifting plunger 109 and the rise and fall of the mold 83.

The contactor switch 195 controls the temporary backing-off or reversal of the molding plunger 26 for releasing entrapped air after the partial completion of a molding stroke. Its energization is under the control of the pressure switch blade 180a, and is also under the control of the time relay switch blade 181a and the limit switch 101. The contactor 195 is provided with two normally open switch blades 195a and 195b, and a normally closed switch blade 195c. The normally open switch blade 195a controls the energization of the contactor 193, with the cooperation of the time relay switch blade 181a and the limit switch 101. The normally open switch blade 195b closes a holding circuit around the pressure switch blade 180a and maintains the energization of the contactor 195. The normally closed switch blade 195c controls the energization of the contactor 191, in cooperation with the limit switch 101. Energization of the contactor 195 and, as a result thereof, closure of switch blade 195b establishes a circuit through switch blade 195b, solenoid 196, and switch blade 192d. Thus solenoid 196 is energized which causes its switch blades 196a and 196b to close thereby establishing a circuit through solenoid 197 the energization of which causes the control valve 113 to effect communication between the bores 210 and the vacuum pump 215.

When the contactor 195 is energized, the opening of its normally closed switch blade 195c deenergizes the contactor 191, which in turn, deenergizes the main solenoid 40 and causes the molding plunger 26 to back off temporarily while the time relay 182 is running its course. When the time period of the time relay 182 has expired, its normally open switch blade 182a closes and energizes the contactor 192, which as previously stated, subsequently controls the readvance of the molding plunger 26 and the completion of the molding stroke. On the other hand, energization of the contactor 192 opens the switch blade 192d, thereby deenergizing solenoid 196 and consequently also solenoid 197, so that the control valve 113 closes again.

The control circuit also contains a number of manually operated switches, among these an on-off switch 200, a pair of normally open forward push-button switches 201 and 202 and a pair of normally closed reverse push-button switches 203 and 204. These manually operated switches are mounted upon the control switch panel 79 on the left-hand cover plate 14, at the front of the press (Figure 1). The control circuit also includes a resistor 205 and a signal light 206, directly connected between the power lines 207 and 208, from which the control circuit is energized but under the control of the on-off switch 200.

*Operation*

In the operation of the press the motor 21 for operating the pumps 19 and 20 is started in operation. The operator then closes the on-off switch to its "on" position so that the control circuit is energized. By rotating the hand-wheel 141 the operator has positioned the adjustable stops 117 for controlling the desired depth of the mold cavity 96. It is also assumed that the operator has filled the mold changer 94, pushed it into position above the mold cavity 96 and has thereby filled the latter to the level of its top with molding material, whereupon the operator has pulled the mold charger 94 back to its outermost position, thereby closing the normally open limit switch 101. The circuit is now ready for starting a working cycle.

To start a working cycle the operator depresses both forward push-button switches 201 and 202. This energizes the contactors 194 and 191 provided that the normally open limit switch 101 has been kept closed by holding the mold charger 94 in its outermost position. The energization of the contactor 191 closes its normally open main blades 191b and 191c, thereby energizing the main solenoid 40 and setting the shifting or flow-control member of the main pump 19 on stroke for forward delivery. The main pump then delivers pressure fluid through the conduits 144, 161 and 160 to the upper ends of the booster and pull-back cylinders 16, causing the plungers 23 and the platen 25 to move downward at a rapid traverse speed. At this time the surge valve 151 (Figure 6) opens automatically by the suction created by the descent of the main plunger 22 and prefills the main cylinder 15 with fluid directly from the surge tank 18. When the main platen 25 has descended a sufficient distance, the platen arm 61 engages the adjustable collar 62 and pulls down the valve rod 58 of the two-way valve 57. Pressure fluid then passes from the conduit 144, through the now open two-way valve 57 and the conduit 145, into the upper end of the main cylinder 15 and acts against the upper end of the main plunger 22, adding its force to the force exerted by the booster plungers 23.

Meanwhile, the adjustable collar 51 on the rod 50 attached to the platen arm 47 has passed by the limit switch 102 without shifting the latter, because the limit switch 102 is constructed and arranged to be shifted only upon the upstroke of the collar 51. The molding plunger 26 then enters the mold cavity 96 and presses the molding material therein downward against the stationary mold bottom 82. Meanwhile, the accumulation of pressure within the main cylinder 15, caused by the slowing down of the molding plunger 26 as it encounters resistance, automatically closes the surge valve 151 and causes the full pressing pressure to be exerted. As the pressing proceeds the pressure created in the main cylinder 15 reaches a predetermined value and closes the normally open pressure switch 180.

The closing of the pressure switch blade 180a energizes the contactor 195 by way of the normally closed time relay switch blade 181a, the reverse push-button 204 and the normally open but now closed limit switch 101. The energization of the contactor 195 opens its normally closed switch blade 195c, deenergizing the contactor 191 and causing its holding circuit switch blade 191a to open. The consequent opening of the switch blade 191b and switch blade 191c deenergizes the main solenoid 40, whereupon the servomotor 28 of the pump 19 is shifted to its reverse position, causing the pump 19 to reverse and deliver pressure fluid through the conduits 163 and 162 to the bottoms of the cylinders 16, causing the plungers 23 to act as pull-back plungers, and retracting the main platen 25 and main plunger 22, together with the molding plunger 26. This retraction of the molding plunger 26 only temporarily occurs, and releases the pressure from the workpiece so as to permit the entrapped air to be withdrawn by the vacuum pump 215 in the following manner;

At the instant the contactor 195 was energized its normally open switch blade 195b closed and formed a holding circuit for the contactor 195. Energization of the contactor 195 and thereby closure of switch blade 195b establishes a circuit through switch blade 195b, solenoid 196 and switch blade 192d, so that solenoid 196 is energized and its switch blades 196a and 196b close. This establishes a circuit through solenoid 197 which is thus energized and by opening control valve 213 effects communication between the bores 210 and the vacuum pump 215. At the same time the normally open switch blade 195a closed and energized the contactor 193 by way of the normally closed time relay switch blade 181a, the reverse switch 204 and the limit switch 101 (Figure 8). The energization of the relay 193 closes its normally open blade 193a and immediately energizes the time relay 182. Thus the latter starts in operation when the pressure switch 180 shifts in response to the attainment of the predetermined pressure for which it is set. When the set time period of the time relay 182 has expired, the latter closes its normally open switch blade 182a, thereby energizing the contactor 192 by way of the normally closed time relay switch blade 181a, the reverse switch 204 and the limit switch 101.

The energization of contactor 192 closes its normally open blades 192b and 192c, to bridge the now open switch blades 191b and 191c, thereby reenergizing the main solenoid 40. This again shifts the flow-control member of the main pump 19 to its forward delivery position, causing it to resume delivery of fluid to resume the advance of the molding plunger 26. At the same time the simultaneous closing of the switch blade 192a places the time relay 181 in condition for subsequent energization by the pressure switch 180. The molding plunger 26 again engages the workpiece within the mold cavity 96, and brings the pressing stroke to a conclusion.

The energization of the contactor 192 also opens the switch blade 192d, thereby deenergizing the solenoid 196 and consequently also the solenoid 197, so that the control valve 113 closes again and breaks the communication between the vacuum pump 215 and the bores 210.

As the material is being pressed the mold 83 moves downward, due to the friction of the material against the mold lining 89. This yielding takes place at the predetermined pressure for which the relief valve 165 has been set (Figure 7). When the pressure again reaches the set pressure of the pressure switch 180, the normally open blades 180a and 180b thereof close, the closing of the pressure switch blade 180b energizing the time relay 181 through the now closed contactor switch blade 192a so that the time relay 181 commences its period of operation. This causes the molding plunger 26 to exert a pressure dwell upon the workpiece or briquette during the expiration of the time relay time period. When this expires the time relay mechanism opens the normally closed time relay switch blade 181a, and simultaneously deenergizes the contactors 192, 193 and 195 (Figure 8). When the contactor 192 is thus deenergized its normally open blade 192a opens and deenergizes the time relay 181, whereas the normally open blades 192b and 192c also open so as to deenergize the main solenoid 40. Thus, the first deenergization of the main solenoid 40 was brought about for a period of time controlled by the time relay 182, whereas the final deenergization thereof was directly under the control of the time relay 181. The deenergization of the contactors 193 and 195, by the opening of the time relay switch blade 181a, automatically opens the switch blades of these contactors.

As the main platen 25 travels upward on its retraction stroke, the platen arm 47 carries the switch-actuating rod 50 upward to a point where the collar 51 engages and opens the normally closed limit switch 102. The opening of the limit switch 102 (Figure 8) deenergizes the contactor 194 and causes its holding circuit switch blade 194a likewise to open. The consequent opening of the contactor switch blades 194b and 194c deenergizes the auxiliary solenoid 75 so as to permit the spring associated with the four-way valve 70 to shift the valve to its opposite position (Figure 7) so that it delivers pressure fluid to the conduit 176 and exhausts fluid from the conduit 177. The mold-shifting plunger 109 moves downward, carrying with it the mold 83 until the upper rim of the mold lining 89 descends to the level of the upper surface of the mold bottom 82. This action ejects the workpiece or briquette and leaves it resting upon the mold bottom 82 with the mold 83 withdrawn to its lower position.

On the next operation, the operator having refilled the mold charger 94, pushes it into registration with the mold aperture 96. The inward motion of the mold charger 94 at the same time pushes the finished workpiece or briquette off the mold bottom 82 and into a suitable chute, or other receiver for finished workpieces. When the mold charger 94 reaches its innermost position over the mold cavity 96, it engages and closes the limit switch 100, thereby reenergizing the contactor 194 because the normally closed limit switch 102 has immediately closed again after the passage of the collar 51 on the rod 50. The reenergization of the contactor 194 again energizes the auxiliary solenoid 75, which in turn, shifts the four-way valve 70 to its mold-raising position, causing the mold-shifting plunger 109 and the mold 83 to rise and return to their upper positions. After the mold cavity 96 has again been filled with molding material, the operator pulls the mold charger 94 back to its outermost position, thereby closing the normally open limit switch 101 and opening the normally open limit switch 100. The energization of the contactor 194, however, is maintained by the holding circuit through its switch blade or interlock 194a bridging the limit switch 100.

In the meantime the press platen 25 has moved upward upon its retraction stroke to a point where the platen arm 47 engages the collar 48 and lifts the main press control rod 46. This motion is transmitted, through the levers 37, 34 and 32, and the connecting rods 35 and 33, to the servomotor control valve rod 29, moving the latter to a position which causes the servomotor to shift the flow-control member or shiftring of the pump to its neutral or no delivery position. The main platen 25, therefore, halts at its uppermost position and remains halted until the operator starts another operating cycle by depressing the forward push-buttons 201 and 202, in the manner previously described. The press may be halted at any point in its forward or return strokes merely by depressing the normally closed reverse push-button switches 203 and 204, this feature being valuable in an emergency.

The return stroke of the main platen 25 is accomplished at a rapid traverse speed by the admission of pressure fluid to the lower ends of the cylinders 16. Thus, the plungers 23 are double-acting so that their upper sides serve as booster plungers for rapidly advancing the main platen 25, and their under sides serve as pull-back areas for rapidly retracting the main platen 25. The motion of the mold 83 upward when the mold charger 94 moves into position above it, creates a suction which helps to draw the molding material into the mold cavity 96. This suction, as well as the gradual decreasing of the mold in depth, serves to reduce the arching over effect previously encountered in other types of molding presses, particularly with granular material such as carbon.

The slowing up of the main platen 25 and molding plunger 26 has the beneficial effect of reducing the blowing away of the molding material, and hence, reduces the formation of dust. The slow pressing at the end of the working stroke has the further beneficial result of slowly squeezing the crystals or particles into their final positions so that they do not have the tendency later to shift around and cause stratification. In mechanical presses, for example, the pressing blow is delivered at such a rapid rate that the crystals do not have time to move into their most suitable positions, hence, the briquette is placed under strain which causes it later to stratify and to develop cracks. The yielding of the mold 83 during the pressing stroke has the beneficial effect of eliminating the necessity of the material slipping along the walls of the mold as the mass of material becomes smaller in size while it is being formed into a block.

The essence of the novel molding method according to the present invention will be best realized by reference to Figures 10 to 15 diagrammatically illustrating various stages of the molding method. Stage a shows the top member 26 of the mold 84 in its uppermost position in which it does not engage the mold 83; similarly also mold 83 is in its uppermost position. The mold top portion 26 is now moved downwardly so as to slidably engage the inner walls of the mold 83. The molding material between the top member 26 and the bottom member 82 of the mold is now compressed and the friction between the partially compressed molding material and the inner walls of the mold 83 causes the latter likewise to move downwardly together with the top member 26. When the material has been compressed to a certain extent so that a predetermined resistance is offered by the molding material, or in other words, when the pressure on the top member 26 has reached a predetermined value, the molding operation is in the stage b. Now the top member 26 is slightly moved upwardly to allow the air entrapped between the top member 26 and the compressed molding material to escape from the mold 83. Thereafter the movement of the top member 26 is again reversed as illustrated in stage c, in which the arrows indicate that the top member 26 and the mold 83 move together downwardly. The final stage of the pressing operation is the stage d, in which the material has been compressed to the desired extent. Thereafter the top member 26 is again moved upwardly while the mold 83 temporarily remains in its position. Now the operation has reached stage e whereupon the ejection of the molded article is effected by moving the mold 83 downwardly until its uppermost portion is about flush with the stationary bottom member 82. This stage is designated as stage f. After the molded article has been ejected the mold 83 is returned to the position shown in stage a so that a new cycle may be started.

This application is a continuation in part application of our application, Serial No. 272,282, filed May 6, 1939.

It will be understood that we desire to comprehend within our invention such modifications as come within the scope of the claims and the invention.

Having thus fully described our invention, what we claim as new and desire to secure by Letters Patent, is:

1. A method of molding granular material in a mold with a top and bottom member movable relative to the mold, which comprises the steps of locating the top member outside the mold, moving the mold and bottom member relative to each other so as to locate the upper surface of the latter adjacent the upper portion of the mold, filling the mold with molding material while gradually increasing the distance between the upper portion of the mold and the upper surface of the mold bottom member, inserting the mold top member into the mold and moving said top member toward said bottom member, exerting hydraulic cushioning pressure on said bottom member during movement of said top member toward said bottom member, compressing the molding material to a predetermined first pressure so as to cause the molding material to frictionally move the mold against said cushioning pressure, temporarily releasing the pressure on the molding material when said first predetermined pressure has been reached, and, while said pressure is released, pumping out the air entrapped in the mold, thereafter again moving the top member toward the bottom member while applying pressure to said top member independent of said cushioning pressure until a second predetermined pressure has been reached, withdrawing the top member after attainment of said last mentioned pressure, and ejecting the molded article from the mold.

2. A method of molding granular material in a mold with relatively movable top and bottom members which comprises the steps of locating the top member outside the mold and the bottom member inside the mold, filling the mold with granular material, inserting the mold top member in the mold and moving said top member toward said bottom member, compressing said molding material to a predetermined pressure, temporarily releasing the pressure on the molding material when said predetermined pressure has been reached, and, while pressure is released, pumping out the air entrapped in the mold, and thereafter relatively moving the top and bottom members of the mold to apply a second predetermined pressure to the molding material.

3. A method of molding granular material in a mold having relatively movable top and bottom members, which comprises the steps of locating said members in position to receive the molding material between them in the mold, filling the mold with molding material, relatively moving said members while applying to the molding material through said members sufficient pressure to compress the material to a predetermined degree, temporarily releasing the pressure on the molding material when said predetermined pressure has been reached, and, while said pressure is released, pumping out the air entrapped in the mold, and subsequently re-applying pressure to the molding material in the mold.

WALTER ERNST.
LESLIE S. HUBBERT.